United States Patent [19]
Bottalico

[11] 3,770,290
[45] Nov. 6, 1973

[54] VEHICLE SHOCK ABSORBER
[76] Inventor: Frank P. Bottalico, 4417 Fort Dr., Suitland, Md. 20023
[22] Filed: Jan. 24, 1972
[21] Appl. No.: 220,180

[52] U.S. Cl......... 280/106.5 R, 267/182, 267/20 R, 188/164
[51] Int. Cl............................................. B62d 31/00
[58] Field of Search................. 188/164, 129; 267/182, 8 R, 8 A, 8 B, 8 C, 20 R; 280/106.5

[56] References Cited
UNITED STATES PATENTS

| | | | |
|---|---|---|---|
| 3,157,395 | 11/1964 | Budzynski et al. | 267/8 |
| 3,443,528 | 5/1969 | Lipsius et al. | 267/182 |
| 1,739,917 | 12/1929 | Rayzor | 267/20 R |
| 938,708 | 11/1909 | Rowe | 267/182 |

Primary Examiner—Philip Goodman
Assistant Examiner—John A. Carroll
Attorney—Charles E. Brown et al.

[57] ABSTRACT

This disclosure relates to novel spring and/or shock absorbing means for an automotive vehicle or like suspension system, the shock absorbing and/or spring means including a pair of magnetic means operable to normally maintain the vehicle frame and wheels in spaced relationship due to magnetic forces of repulsion, and means normally biasing the pair of magnetic means toward each other. The pair of magnetic means may be permanent magnets or electromagnets, and in the latter case the electrical system of the vehicle is the source of electromagnet energization which may be varied by a conventional slide wire or equivalent potential divider to vary the magnetic force. Means are also provided for guiding the movement of the pair of magnetic means toward and away from each other.

5 Claims, 3 Drawing Figures

PATENTED NOV 6 1973  3,770,290
FIG.1
FIG.2
FIG.3
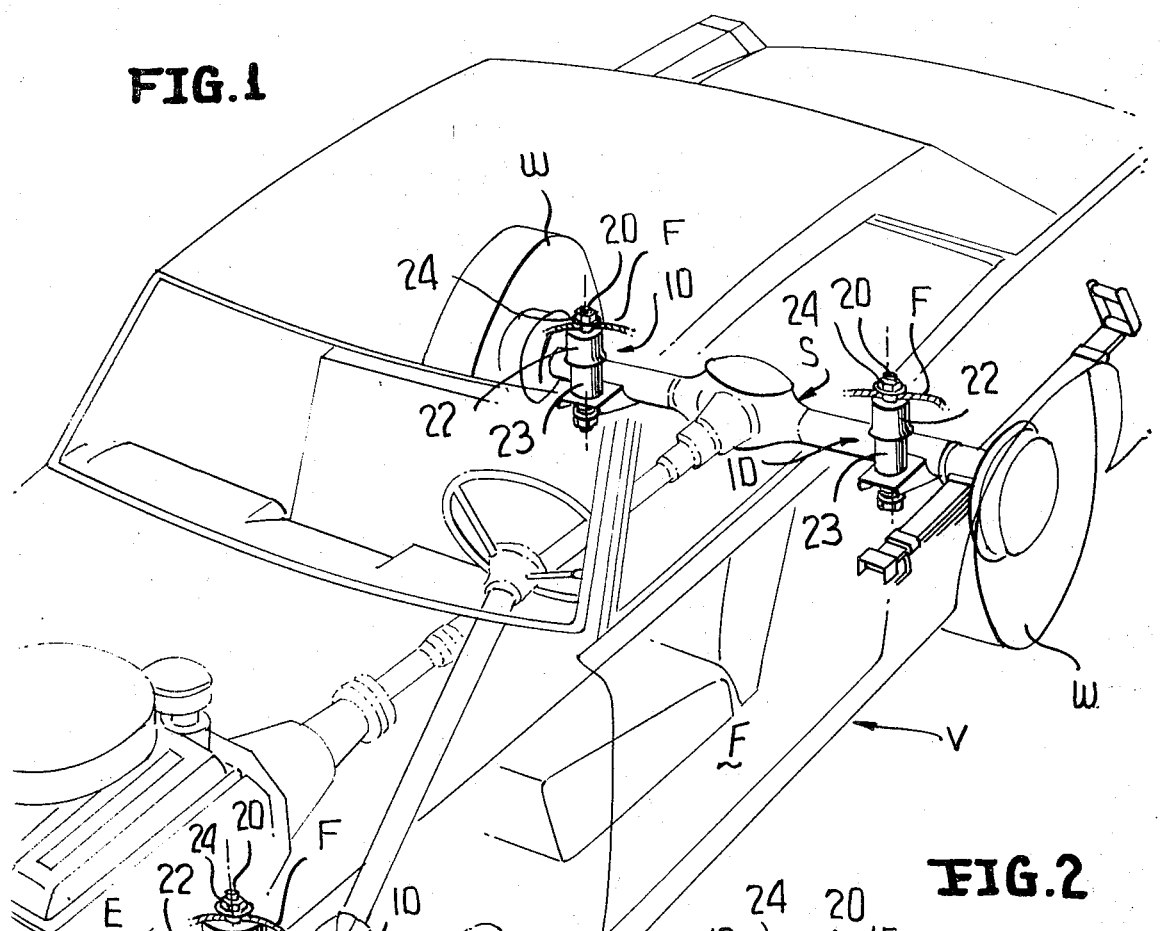
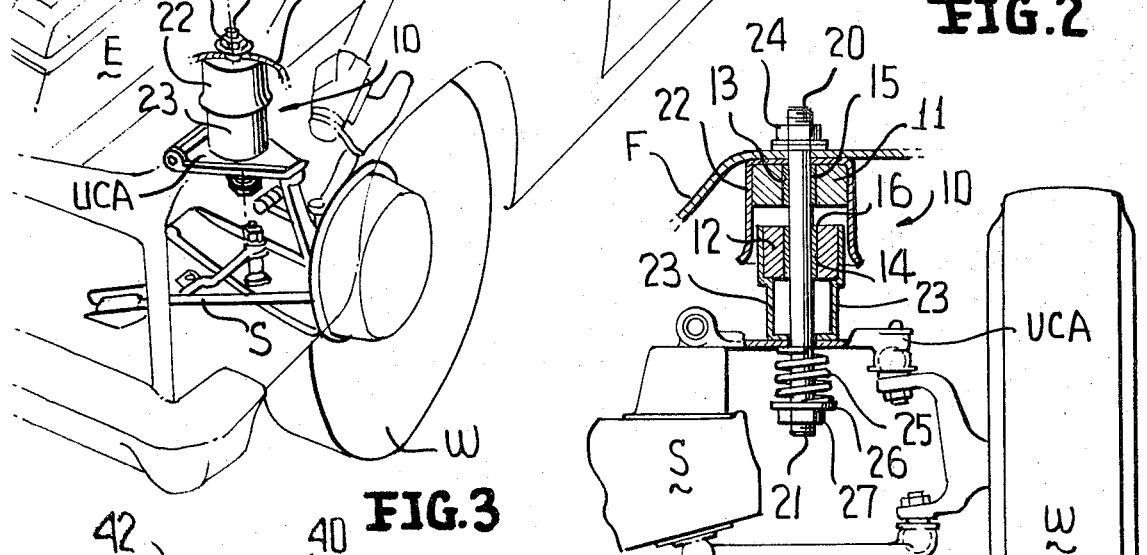
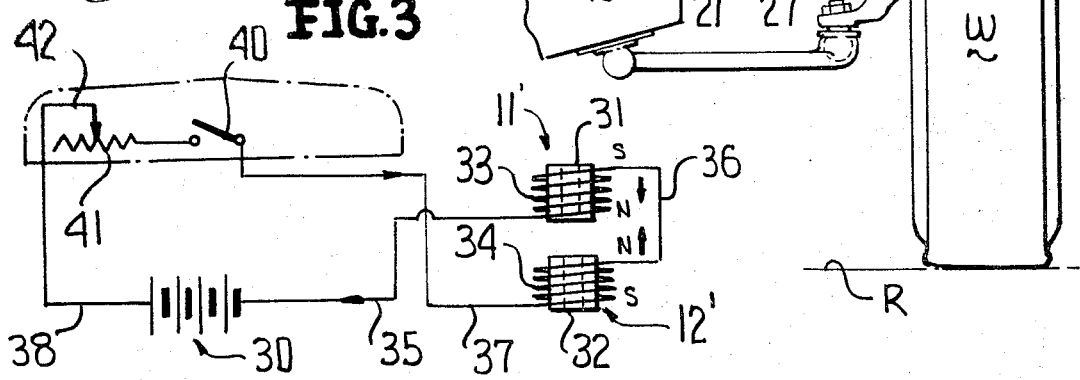

3,770,290

VEHICLE SHOCK ABSORBER

A primary object of this invention is to provide novel shock absorbing and/or spring means between a vehicle frame and its wheels, each shock absorbing and/or spring means being a pair of magnetic means operable to normally maintain the vehicle frame and wheels in spaced relationship due to magnetic forces of repulsion, and means normally biasing the pair of magnetic means toward each other.

A further object of this invention is to provide novel shock absorbing and/or spring means of the type heretofore described including guide means for guiding the movement of the pair of magnetic means toward and away from each other, the guide means being in the form of a rod passing through openings of the pair of magnetic means and/or a pair of housings in telescopic relationship with each housing confining one of the pair of magnetic means.

Yet another object of this invention is to provide a novel shock absorber and/or spring of the type heretofore described wherein the magnetic means are either permanent magnets or electromagnets, and in the latter case means are provided for varying the magnetic force by, for example, a potential divider.

Still another object of this invention is to provide a novel shock absorber and/or spring wherein the biasing means is in the form of a coil spring and the coil spring and pair of magnetic means are located on opposite sides of a portion of the vehicle suspension system.

With the above and other objects in view that will hereinafter appear, the nature of the invention will be more clearly understood by reference to the following detailed description, the appended claimed subject matter, and the several views illustrated in the accompanying drawing.

In the drawing:

FIG. 1 is a fragmentary perspective phantom view of an automobile, and illustrates in conjunction with the vehicle suspension system spring means and/or shock absorbing means mounted adjacent each wheel.

FIG. 2 is an axial sectional view taken through the combined shock absorber and spring associated with the illustrated front wheel, and illustrates the same as a pair of magnets normally maintaining the vehicle frame and wheels in spaced relationship due to magnetic forces of repulsion while a coil spring normally biases the magnets in a direction toward each other.

FIG. 3 is an electrical schematic view, and illustrates the use of electromagnets in lieu of the permanent magnets and means for varying the force of repulsion therebetween.

An automobile vehicle V includes a body or frame F suspended from a conventional suspension system S which is in part defined by front and rear wheels W. The present invention is specifically directed to the construction of shock absorbing means and/or spring means 10 mounted between the vehicle frame F and the suspension system S adjacent each wheel W. The phrase "shock absorbing means and/or spring means 10" is intended to include (1) the use of the means 10 as a shock absorber per se as, for example, when utilized as illustrated in FIG. 1 with each rear wheel having its own separate conventional suspension spring S1; (2) or both as a combined spring and shock absorber, as for example, when used as illustrated with the front wheel in FIG. 1 absent both a conventional spring and a conventional shock absorber; (3) or as a spring in combination with a conventional shock absorber (not shown), or (4) equivalents thereof. Thus, reference will be made hereinafter in both the specification and claims to only "shock absorbing means 10," but this phrase is intended to include items (1) through (4) noted immediately heretofore. Morever, inasmuch as the shock absorbing means of FIG. 1 are identical, reference will be made only to the shock absorbing means 10 associated with the front wheel, as is best illustrated in FIG. 2.

The shock absorbing means 10 of FIG. 2 includes a pair of magnetic means 11, 12 in the form of permanent magnets of an annular-shaped configuration each having a central axial opening 13, 14, respectively, within which are disposed antifriction means 15, 16, respectively, in the form of bushings of wear resistant material, needle bearings either full complement or caged, or the like. Guide means 17 in the form of a rod constructed from antimagnetic material or nonmagnetizable material is in internal telescopic relationship to the bushings 13, 14, and has opposite threaded end portions 20, 21. The rod 17 passes through openings (unnumbered) in end walls (also unnumbered) of a pair of housings 22, 23 which respectively receive the magnets 11, 12. The housings 22, 23 may, if constructed from sufficiently rigid material, also serve as means for guiding the movement of the magnets 11,12 toward each other due to the telescopic relationship of the housings.

The threaded end portion 20 of the rod 17 projects through an opening (unnumbered) of the frame F, and is secured in the position shown in FIG. 2 by a nut 24 with a plurality of washers (unnumbered) being positioned between the nut 24 and the frame F, if found necessary or desirable.

The lower threaded end portion 21 passes through an opening (unnumbered) of the vehicle's upper control arm UCA, and spring means in the form of a coil compression spring 25 surrounds the lower end of the rod 17 and is sandwiched between the upper control arm UCA and a wahser 26 held in position by a nut 27. The force of the spring 25 thus functions to normally draw the magnets 11, 12 toward each other against the magnetic forces of repulsion thereof. In this manner undesired floating which would occur through the use of the magnets 11, 12, alone is precluded and such is in effect damped or absorbed by the spring 25. Moreover, the biasing force of the spring 25 may be varied by simply tightening or loosening the nut 27 and securing the same in any desired position of adjustment by, for example, the use of a lock nut (not shown) threaded upon the threaded end portion 21. Thus, as the vehicle V moves along a roadway R (FIG. 2) the bounces of the wheel W are transmitted through the spindle (unnumbered), the associated ball joints (also unnumbered), and the upper control arm UCA to the shock absorber 10 associated therewith. Though not illustrated, like bouncing or vibrations of the unillustrated front wheel are communicated to the shock absorber associated therewith, with similar action taking place at the rear end of the vehicle V. It will be apparent that the space between the magnets 11,12 is lessened or the tendency thereof to lessen occurs when the wheel W rises whereas the space widens or tends to widen when the wheel W drops. However, the tendency of the space to decrease is repulsed by the magnetic forces of repulsion whereas the tendency of the space to increase is repulsed by the coil spring 25 which, as was heretofore noted, tends to at all times bias the magnets 11, 12 toward each other. In this fashion relatively smooth performance of the shock absorbers 10 is achieved during the travel of the vehicle V.

Reference is now made to FIG. 3 which schematically illustrates an electrical system which is energized by the automobile battery, a generator driven by the automobile engine E in a conventional manner, or an analogous source of electrical energy. The energy source is generally designated by the reference numeral 30 and is designed to energize a pair of electromagnets 11', 12' which are defined by a pair of apertured annular cores 31, 32, respectively, of soft iron or other highly permeable material and oppositely wound helical coils 33, 34 which when energized by current flowing in the direction of the unnumbered headed arrows results in like opposing poles (north) being adjacent each other resulting in magnetic repulsion. The coils 33, 34 are coupled by suitable conductors 35, 36, 37 and 38 to each other, to the electrical energy source 30, to a switch 40, and to a potential divider 41 having a movable arm 42. With the switch 40 in its closed position the electromagnets 11', 12' will repel each other and thus when substituted for the permanent magnets 11, 12 will result in a similarly operative shock absorber except the force of repulsion can be varied by moving the arm 42. Therefore, preferably the switch 40 and the arm 42 are readily accessible at the vehicle dashboard which is indicated by the dashed box in FIG. 3.

While preferred forms and arrangements of parts have been shown in illustrating the invention, it is to be clearly understood that various changes in details and arrangement of parts may be made without departing from the spirit and scope of this disclosure.

I claim:

1. In a vehicle suspension system which includes a vehicle frame, a wheel support, and shock absorbing means therebetween, the improvement comprising a pair of relatively telescopic tubes, magnetic means in each tube operable to normally maintain said vehicle frame and wheel support in spaced relationship due to magnetic forces of repulsion, a rod, said rod passes through apertures in said magnetic means, said vehicle frame and said wheel support, said rod having opposite ends projecting through and beyond the apertures of said vehicle frame and said wheel support means coupling said rod ends one to said wheel support and one to said vehicle frame, and biasing means between one of said coupling means and one of said vehicle frame and wheel support for normally biasing said magnetic means toward each other.

2. The improvement in a vehicle suspension system as defined in claim 1 wherein said tubes are constructed from anti-magnetic material.

3. The improvement in a vehicle suspension system as defined in claim 1 wherein said biasing means is a coil spring.

4. The improvement in a vehicle suspension system as defined in claim 1 wherein said biasing means is a coil spring in external telescopic relationship to said one rod end.

5. The improvement in a vehicle suspension system as defined in claim 1 including bearing means between said pair of magnetic means and said rod.

* * * * *